(12) United States Patent
Chu

(10) Patent No.: US 7,086,536 B2
(45) Date of Patent: Aug. 8, 2006

(54) FLUID FILTERING DEVICE WITH SCRAPING ELEMENT

(76) Inventor: Rey-Chin Chu, 5 F, No. 68, Alley 76, Lane 600, Wu-Sin St., Taipei (TW)

( * ) Notice: Subject to any disclaimer, the term of this patent is extended or adjusted under 35 U.S.C. 154(b) by 147 days.

(21) Appl. No.: 10/797,074

(22) Filed: Mar. 11, 2004

(65) Prior Publication Data

US 2004/0262214 A1 Dec. 30, 2004

(30) Foreign Application Priority Data

Jun. 30, 2003 (TW) .............................. 92211993 U (51) Int. Cl.
*B01D 29/64* (2006.01)
*B01D 29/03* (2006.01)
*B01D 46/04* (2006.01)

(52) U.S. Cl. .................. 210/413; 210/415; 210/295; 210/510.1; 55/295; 55/296; 55/301; 55/429

(58) Field of Classification Search ............... 210/413, 210/415, 295, 510.1; 55/429, 430, 431, 432, 55/433, 295, 296, 301
See application file for complete search history.

(56) References Cited

U.S. PATENT DOCUMENTS

| 536,536 | A | * | 3/1895 | Lindsay | .................. 210/415 |
| 625,131 | A | * | 5/1899 | Abbott | ....................... 210/415 |
| 776,550 | A | * | 12/1904 | Rice | ........................... 210/414 |
| 1,534,394 | A | * | 4/1925 | Kazienko | ................... 209/405 |
| 2,081,009 | A | * | 5/1937 | Kelley | ........................ 210/303 |
| 2,399,994 | A | * | 5/1946 | Feagin | ....................... 210/303 |
| 2,606,663 | A | * | 8/1952 | Blackman et al. | .......... 210/303 |

* cited by examiner

*Primary Examiner*—Thomas M. Lithgow
(74) *Attorney, Agent, or Firm*—Bacon & Thomas, PLLC (57) ABSTRACT

A fluid filtering device includes a housing, a driving device, a filter and a scraping device. The housing has a top portion, a wall portion downwardly extending from the periphery of the top portion and an inlet disposed in the top portion to allow the entry of fluid. The driving device is disposed above the top portion. The filter is disposed near the bottom surface of the housing. The filtered fluid and the impurities are discharged through the underside and the outside, respectively, of the filter. The scraping device has a connecting element driven by the driving device, a scraping element disposed below the connecting element and abutting the upper edge the filter and a flexible element disposed between the connecting element and the scraping element and exerting a constant downward force on the scraping element. Therefore, this invention can provide a fluid filtering device that is structurally simple, may be further miniaturized and may be used in various types of places.

12 Claims, 7 Drawing Sheets

FLUID FILTERING DEVICE WITH SCRAPING ELEMENT

FIELD OF THE INVENTION

The invention generally relates to a filtering device. More particularly, the invention relates to a filtering device that may be further miniaturized and may be used in various types of places.

BACKGROUND OF THE INVENTION

Figure 1:
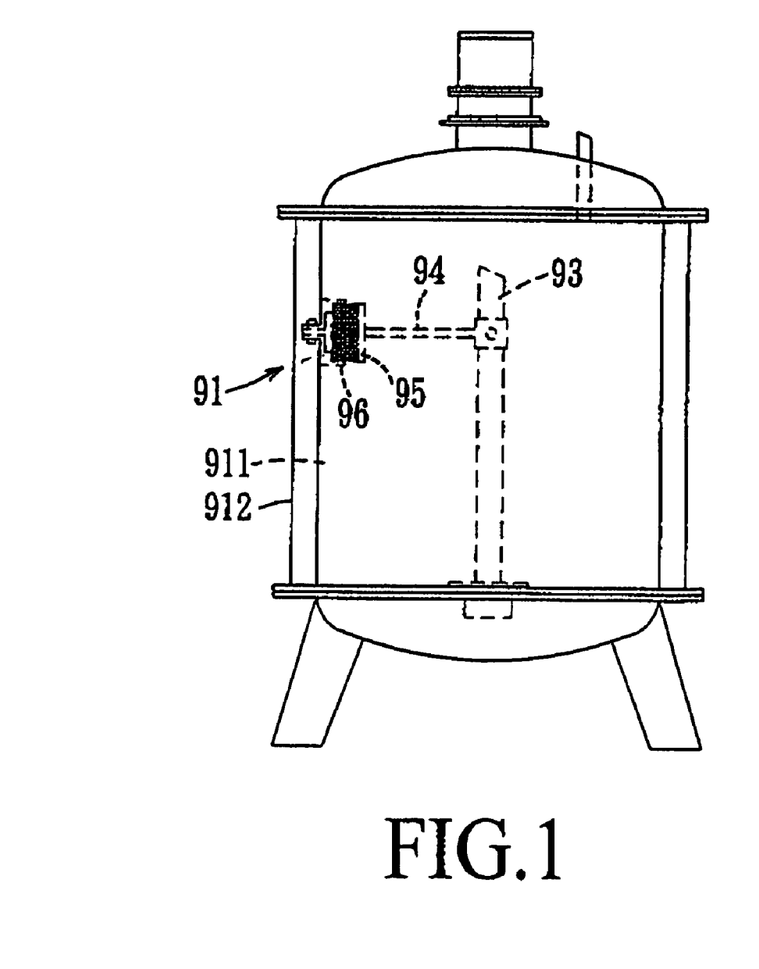
FIG. 1 schematically illustrates a front view of the porcelain filtering device of the ROC Patent No. 90,205,282.
Figure 2:
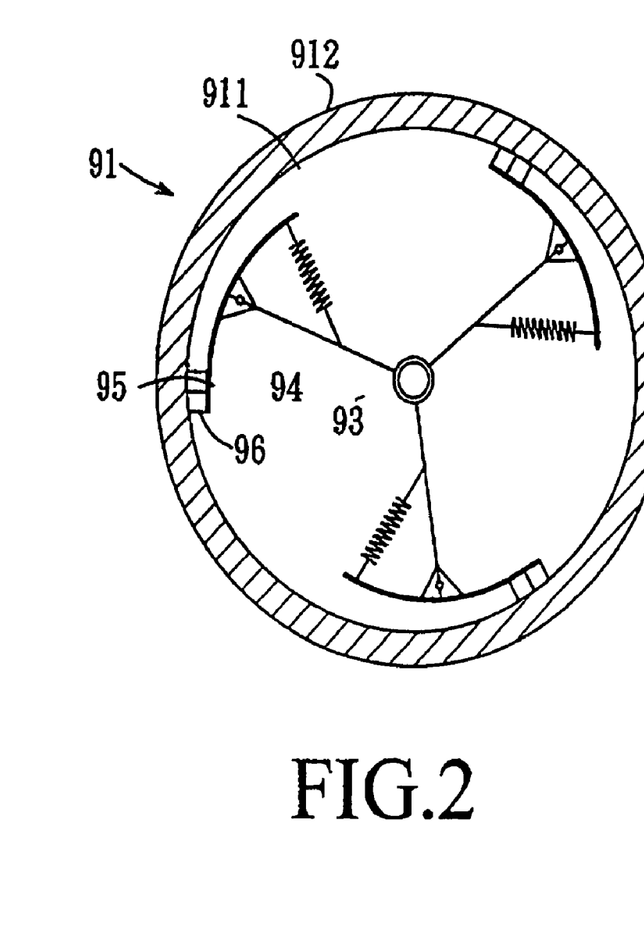
FIG. 2 schematically illustrates a top view of the porcelain filtering device of FIG. 1.

The filter of a water filtering device is often made of porcelain. FIGS. 1 and 2 illustrate the filtering device of the ROC Patent No. 90,205,282. It's housing 91 has a cylindrical shape and comprises two layers: an inner layer 911, which has a multiple of holes, and an outer layer 912. A motor disposed on the top of the housing 91 can drive an axle 93 and a multiple of support rods 94. Porcelain filtering elements 96 disposed on the inner layer 911 may then be scraped off by the arcuate elements 95 attached to the ends of the rods 94. Also, a flexible element is provided on each rod to act as a cushion.

In the filtering device, though impurities built up on the porcelain filtering elements 96 may be scraped off, the device's dimensions are too large and the device's design is too complicated. Because the housing 91 contains two layers and its arcuate elements 95 outwardly and radially extend from the axle 93, it would be difficult to reduce the radial dimension of the housing 91 and hence the device can not be used in places with limited space, such as home. Also, because the device comprises the axle, a multiple of rods 94, arcuate elements 95, flexible elements 97, etc., the device is structurally complicated and hence is subject to damage and malfunction.

SUMMARY OF THE INVENTION

The primary purpose of the present invention is to provide a structurally simple fluid filtering device, which may be further miniaturized.

The secondary purpose of the present invention is to provide a fluid filtering device that has a high degree of flexibility in terms of use.

A fluid filtering device comprises a housing, a driving device, a filter and a scraping device. The housing has a top portion, a wall portion downwardly extending from the periphery of the top portion and an inlet disposed in the top portion to allow the entry of fluid. The driving device is disposed at the top portion. The filter is disposed near the bottom surface of the housing. The filtered fluid and the impurities are discharged through the underside of the filter and the upper part of the interior of the housing, respectively. The scraping device has a connecting element driven by the driving device, a scraping element disposed below the connecting element and abutting the upper edge of the filter and a flexible element disposed between the connecting element and the scraping element and exerting a constant downward force on the scraping element.

In a preferred embodiment, the scraping device has at least one guiding element disposed between the connecting element and the scraping element to ensure that the scraping element moves in a vertical manner.

In the preferred embodiment, an inclined weir, which may guide the lighter impurities, is provided in the interior of the wall portion, and an outlet is provided near the weir so as to allow the discharge of impurities.

In the preferred embodiment, a tank is provided below the bottom side of the housing so as to store the filtered impurities.

DETAILED DESCRIPTION OF THE PREFERRED EMBODIMENTS

The aforesaid purposes and other aspects, features and advantages of the present invention will become better understood with reference to the following description and accompanying drawings.

Figure 3:
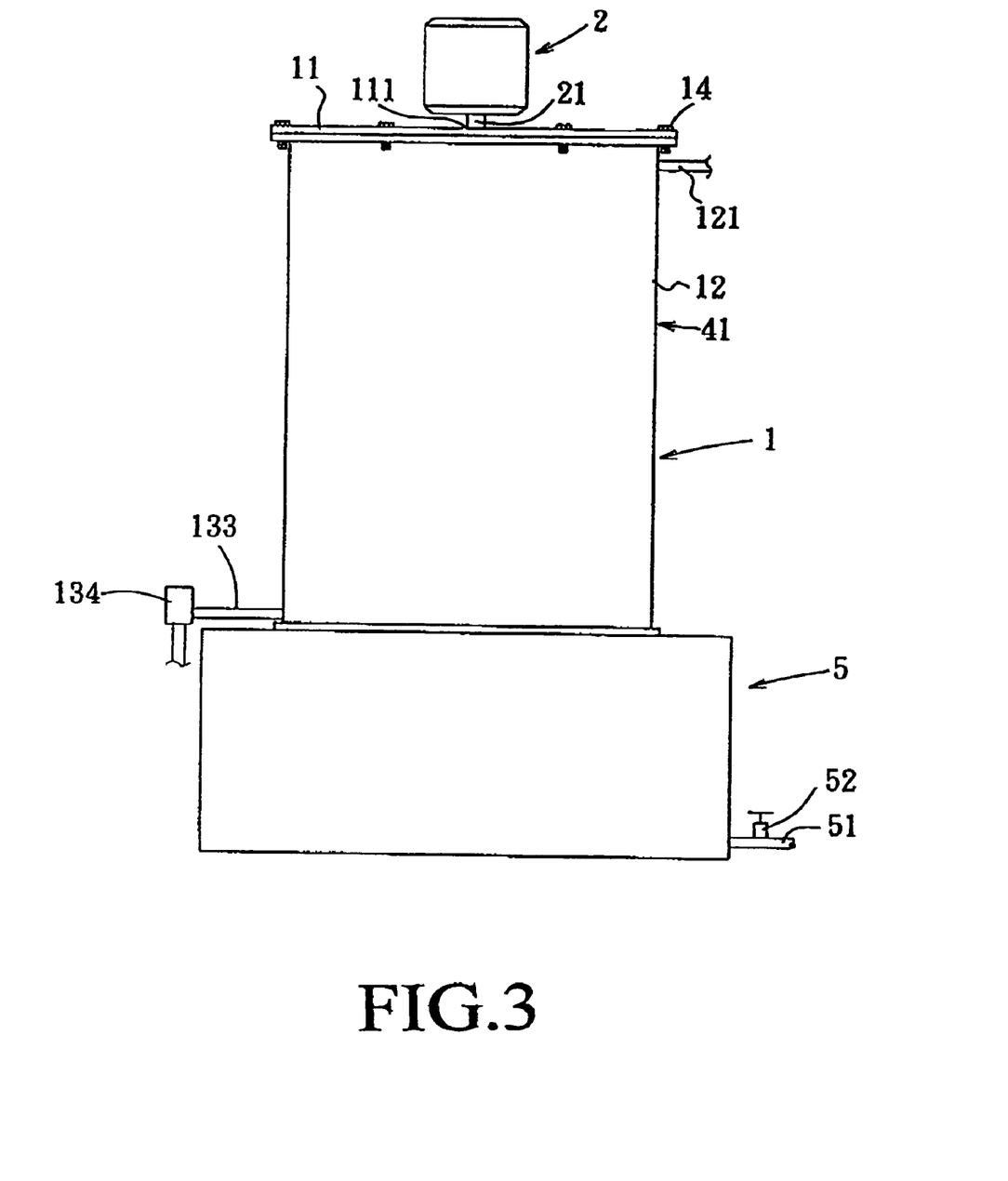
FIG. 3 is a front view of the first embodiment of the present fluid filtering device.
Figure 4:
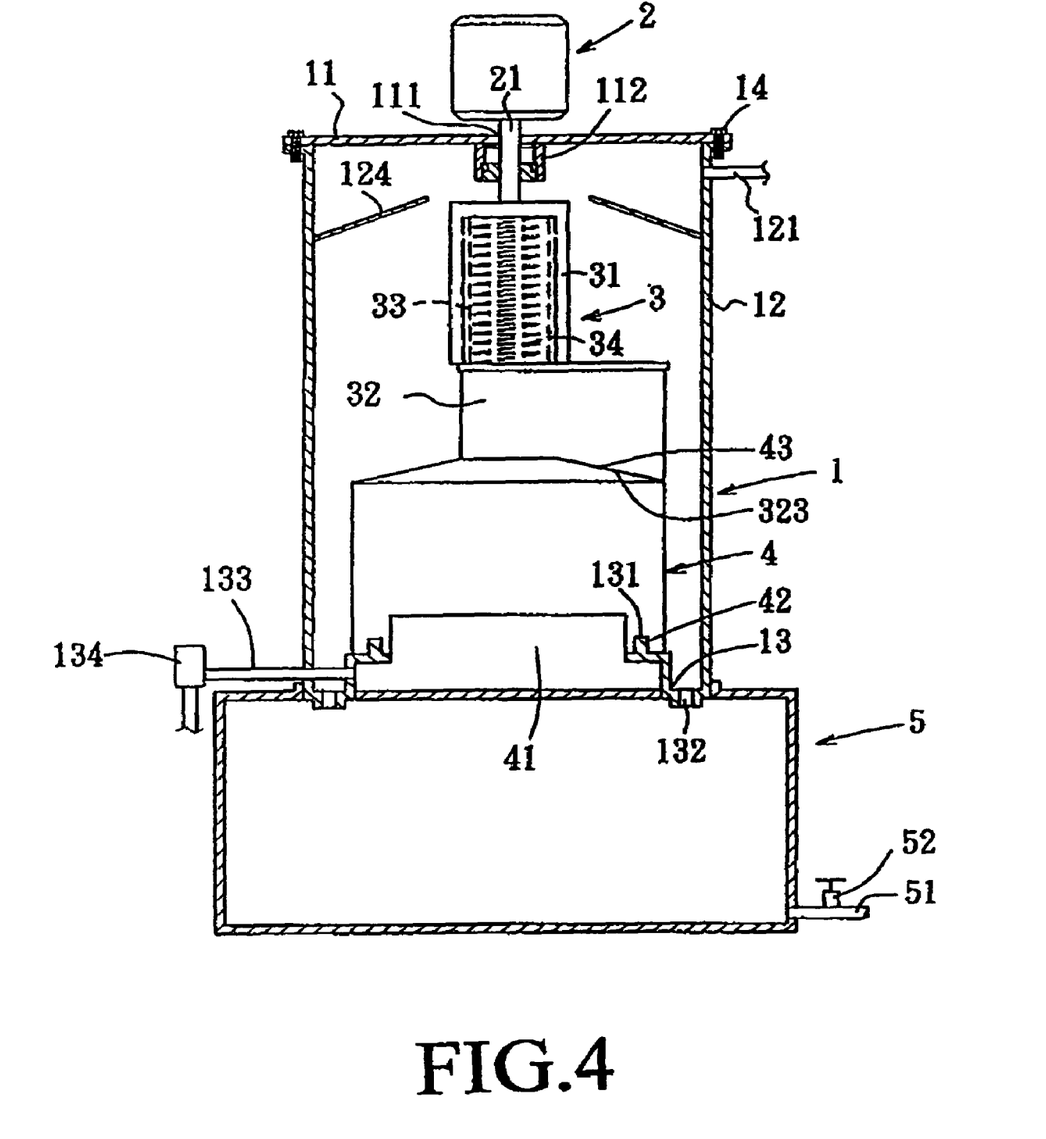
FIG. 4 schematically illustrates a cross sectional view of the first embodiment.

As illustrated in FIGS. 3 and 4, a first embodiment of the present invention comprises a housing 1, a driving device 2, a scraping device 3, a filter 4 and a tank 5. The filtering device may be used to filter or purify soiled water or other liquids.

Figure 5:
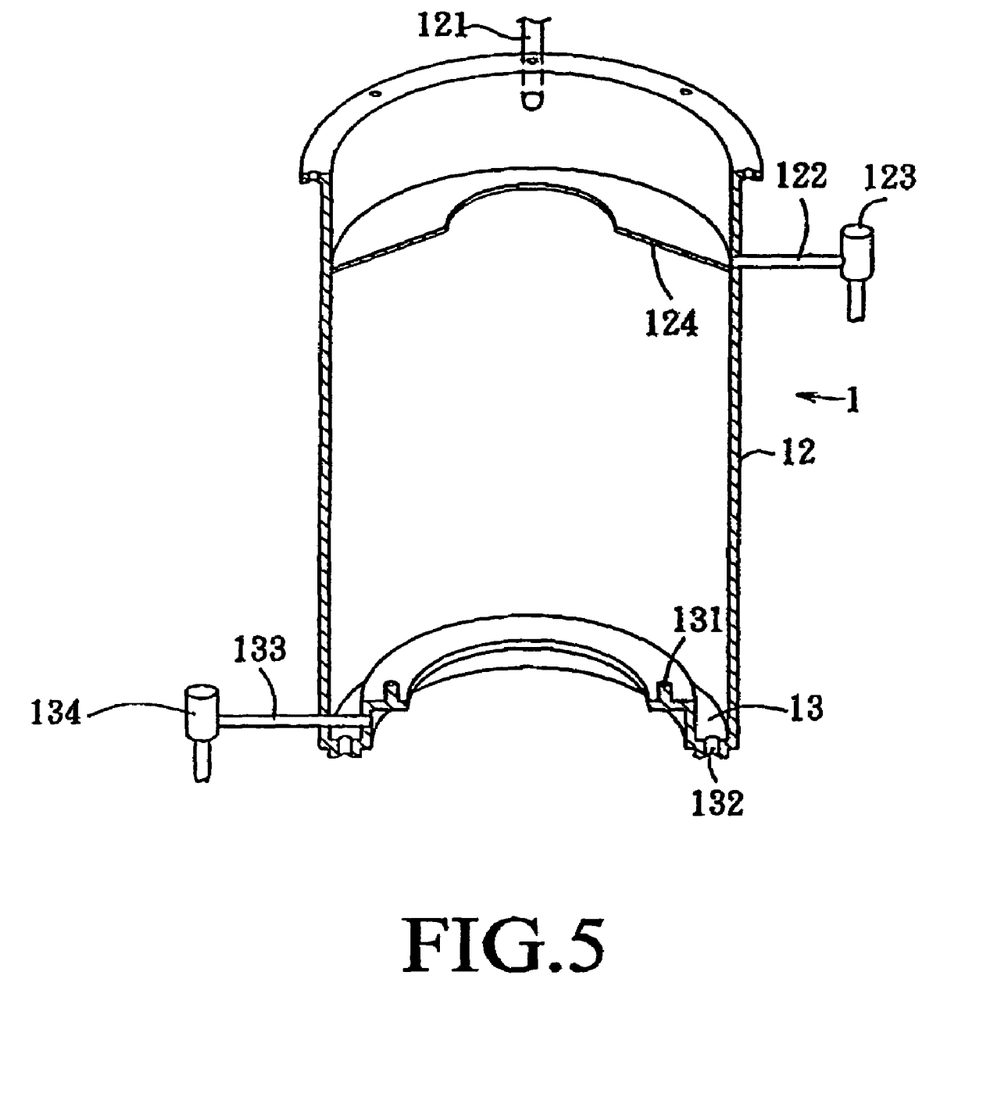
FIG. 5 is a cutaway view, showing only the housing and some relevant components.

As shown in FIGS. 4 and 5, the housing 1 is made of steel or other suitable material that can withstand the pressure exerted by the fluid contained in the interior of the housing. The housing 1 has a round top portion 11, a wall portion 12 downwardly extending from the periphery of the top portion 11 and a bottom portion 13 radially and inwardly extending from the lower periphery of the wall portion 12. The housing 1 has a cylindrical shape. The top portion 11 is detachably connected to the wall portion 12 via a multiple of bolts 14 so as to allow for easy access in repair and maintenance. An inlet pipe 121 is provided at an upper part of the wall portion 12; an outlet pipe 122 is provided at a lower position with respect to the inlet pipe 121 and 90 degrees from the inlet pipe 121 on the circle defined by the inlet pipe 121. A valve 123, which is in a closed position most of the times, is provided at the end of the outlet pipe 122. When the valve 123 is at an open position, it can allow the discharge of the lighter impurities collected by a weir 124, which has a ring shape (with its cross section showing an inclined angle) and provided at the upper part of the interior of the wall portion 12. In this embodiment, the valve 123 is an electromagnetic valve; however, a manually operated valve or other type of valve may also be used.

The driving device 2 is an electric motor and is fixedly disposed at the center of the circle formed by the top portion 11. An axle 21 of driving device 2 extends through an opening 111 in the top portion 11 and bearings 112 and into the interior of the housing 1.

Figure 6:
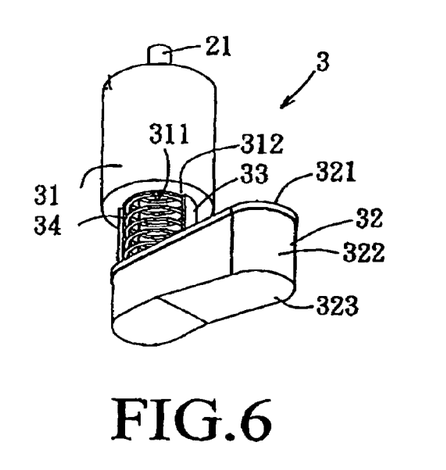
FIG. 6 is a perspective view of the scraping device of the first embodiment with a spring member in an extended position.

As illustrated in FIGS. 4 and 6, the scraping device 3 has a connecting element 31 driven by the driving device 2, a scraping element 32 disposed below the connecting element 31 and abutting the upper edge of the filter 4, a pair of guiding elements 33 disposed between the connecting element 31 and the scraping element 32 and guiding the motion of the scraping element 32 and a spring element 34 disposed between the connecting element 31 and the scraping element 32 and exerting a constant downward force on the scraping element 32. The top surface of the connecting element 31 is closed and the bottom surface of the connecting element 31 is open; a cavity 311 is formed in the connecting element 31. The top surface of the connecting element 31 is fixedly connected to the lower end of the axle 21. The scraping element 32 has a seating element 321 disposed on its top to hold a rectangular body 322; the element 321 has two arcuate surfaces oppositely disposed at its two ends. The rectangular body 322 has an inclined lower surface 323 matching the upper surface of the filter 4; this will be elaborated in the following. Each of the two guiding elements 33 has a rod-like shape and the upper parts of these elements 33 are disposed in the guiding tracks 312 provided in the inner surface of the connecting element 31. The lower portions of the elements 33 are fixedly connected to the seating member 321; therefore, the guiding elements 33 can guide the scraping element 32 to move in a vertical manner and can allow the guiding elements 33 and the scraping element 32 to rotate with the connecting element 31. In this embodiment, the flexible element 34 is a spring. The upper end of the flexible element 34 is held in the cavity 311, and the lower end of the flexible element 34 flexibly presses against the upper surface of the seating member 321 so as to exert a constant downward force on the scraping element 32; in this way, the scraping element 32 may flexibly press against the upper surface of the filter 4 so as to carry out the scraping in an effective manner.

Figure 7:
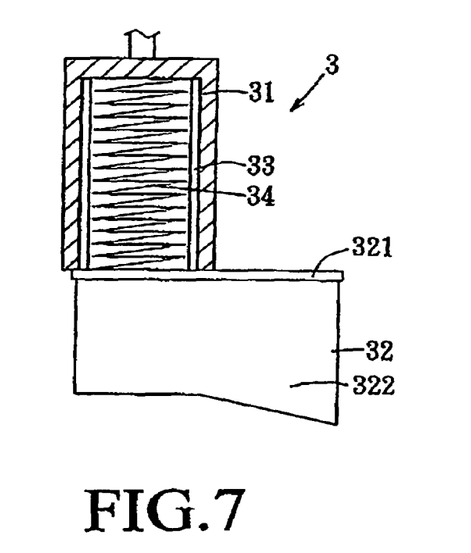
FIG. 7 is a front cross sectional view of the scraping device with the spring member in a compressed position.
Figure 8:
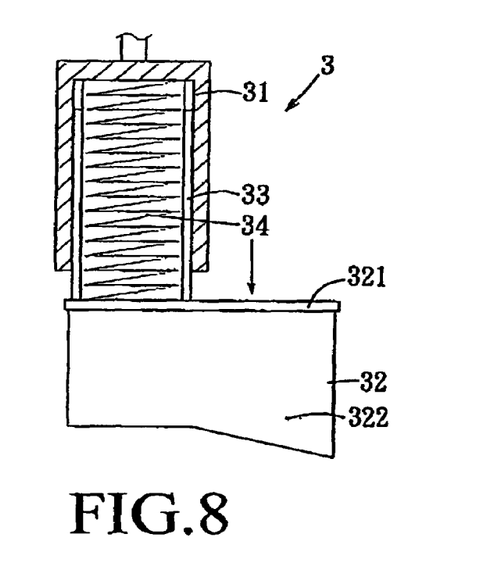
FIG. 8 is a front cross sectional view of the scraping device with the spring member in the extended position.
Figure 9:
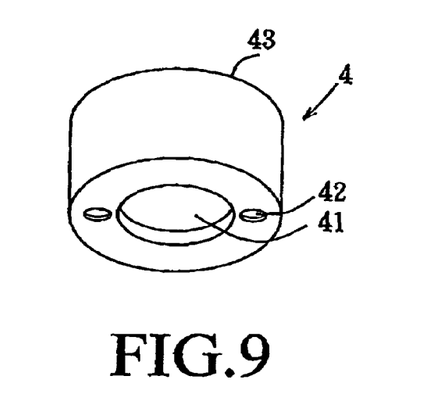
FIG. 9 is a perspective view of the filter used in the first embodiment, illustrating its structure.

As illustrated in FIGS. 4 and 7, the filter 4 has a diameter that is slightly less than the inner diameter of the housing 1. A circular recess 41 and a pair of positioning holes 42 oppositely disposed near the recess 41 are provided at the bottom side of the filter 4. With the engagement of a pair of positioning protrusions 131 located at the inner bottom surface 13 of the housing 1 with the positioning holes 42, the filter 4 may be properly positioned on the inner bottom surface 13 of the housing 1. Two outlet holes 132 are provided on the inner bottom surface 13 of the housing 1 so as to allow the discharge of impurities. A pipe 133 is provided on the inner bottom surface 13 of the housing 1 so as to discharge the filtered fluid. A valve 134, which is in a closed position most of the times, is fitted on the pipe 133. In this embodiment, the valve 134 is electrically operated; however, manual operation or other way of operation may also be employed. As previously described, the top part of the filter 4 has an inclined surface 43 so that the filtered impurities scraped by the scraping element 32 and the grindings and debris generated by and between the scraping element 32 and the filter 4 may fall to the inner bottom surface 13 of the housing 1 by gravity and then may be discharged through the two outlet holes 132. In addition, the filter 4 and the scraping element 32 are made of porcelain and emery, respectively; however, other material may also be used.

A tank 5 is provided below the bottom surface of the housing. The filtered impurities scraped by the scraping element 32 and the grindings and debris generated by and between the scraping element 32 and the filter 4 may be discharged from the two outlet holes 132 and may then enter and be held in the tank 5 on a temporary basis. Periodically, the impurities, grindings and debris held in the tank may be discharged through an outlet pipe 51 and a valve 52.

In use, first, fluid sufficiently pressurized by a pump (not shown) enters the interior of the housing 1 through the inlet pipe 121 and then enters the filter 4 to have impurities filtered out. The filtered fluid then flows into the circular recess. When we want to use the filtered fluid, we can open the valve 134 to allow the filtered fluid to flow out through the outlet pipe 133.

In the filtering process, when the filter 4 is blocked or covered by the impurities to a certain predetermined level, the driving device 2 will be activated and the driving device will rotate the scraping device 3 so as to scrape off the filtered out impurities accumulated on top of the filter 4. When the scraping device 3 scrapes off the impurities, the impurities will be ground by and between the scraping element 32 and the filter 4 and two types of grindings will be generated: lighter grindings and heavier grindings. Heavier grindings will fall to the tank and be stored therein; lighter grindings will rise up to the top part of the housing when the fluid stops moving. In use, lighter grindings may be guided by the weir 124 and may then be discharged through the outlet pipe 122 and the valve 123. Also, when the filter 4 becomes thinner due to the friction between the filter 4 and the scraping device 32, as previously described, the flexibility of the flexible element will exert an appropriate amount of force on the top surface of the filter 4 so as to ensure the effectiveness of the scraping. When a pressure sensor/switch (not shown) detects that the pressure of the fluid in the housing 1 drops below a certain predetermined value, this would mean that the filter 4 has become too thin and lost its filtering function, and the pressure sensor/switch will activate a warning light or horn to remind the operator that the filter 4 should be replaced.

With such design, this invention provides a fluid filtering device that is structurally simple. Because its driving device 2, scraping device 3 and filter 4 are disposed in a continuous, cascading manner, the diameter of the housing 1 and hence the overall volume may be reduced; therefore, this device may be used for the fluid filtering process of the manufacturing sector, and the device may be further miniaturized to be used in places with limited space, such as kitchen. In addition, the device has a high level of flexibility in terms of use. In contract to prior art filtering devices, the device of the present invention has a single-layer housing and its components are more compact; therefore, the cost in manufacture may be reduced, down-time may be decreased and maintenance and repair may be easily carried out.

Figure 10:
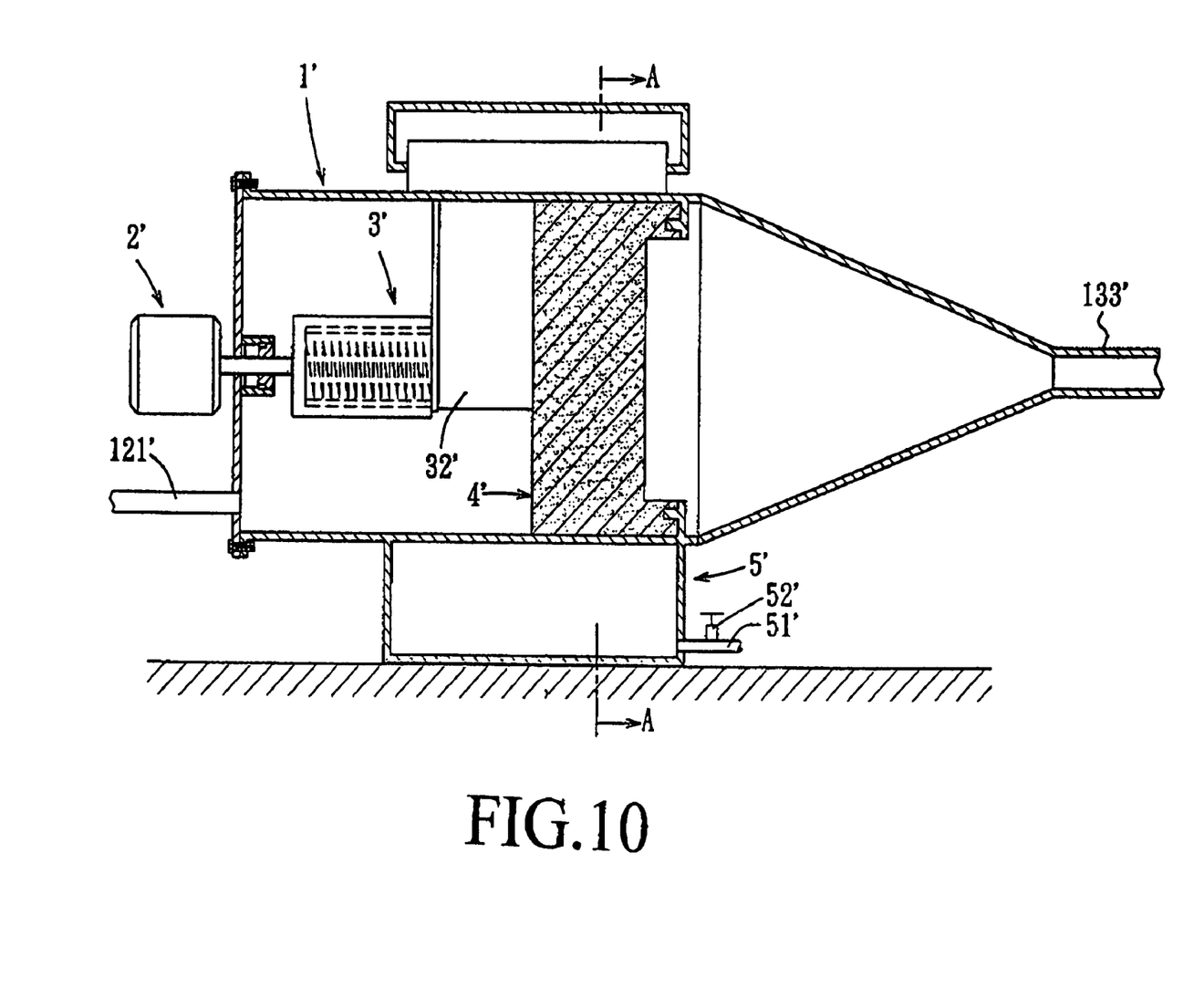
FIG. 10 is a front cross sectional view of the second embodiment of the present invention.
Figure 11:
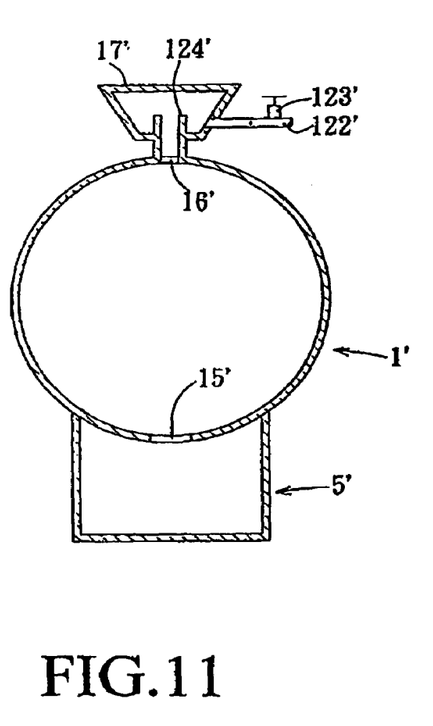
FIG. 11 is a cross sectional view along line A—A in FIG. 10.
Figure 12:
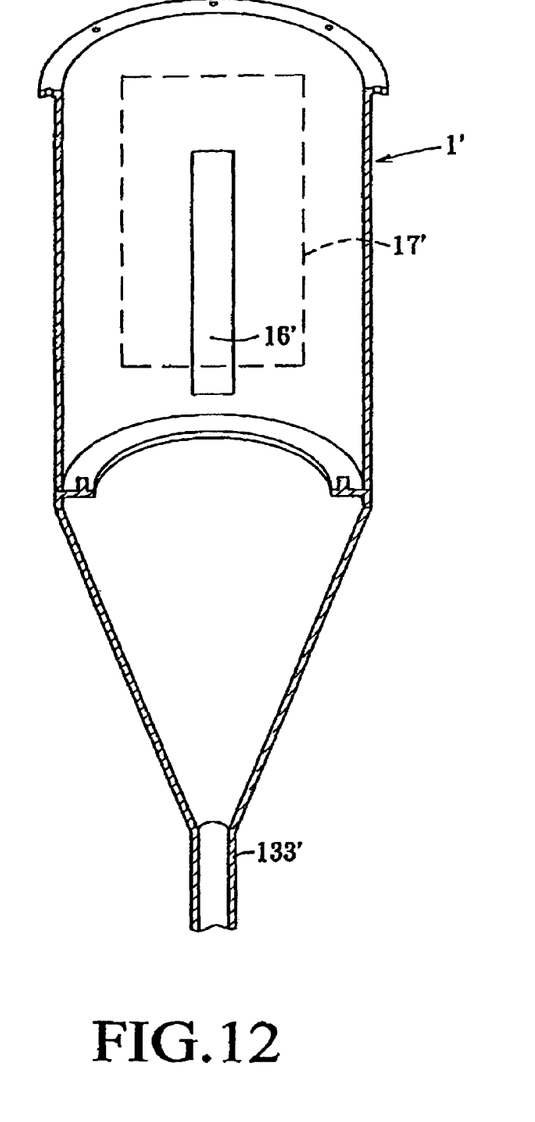
FIG. 12 is a perspective view, showing some components of the second embodiment of the present invention.

In addition, the present invention may be used in the filtering of gases or exhausts discharged from automobiles, factories or other sources. A second embodiment of the invention, as illustrated in FIGS. 10–12, may serve such purpose. The device of the second embodiment mainly comprises a housing 1', a driving device 2', a scraping device 3', a filter 4' and a tank 5'. The main difference between the first embodiment and the second embodiment is that the latter has a horizontal configuration. In the second embodiment, properly pressurized gas (not shown) enters the interior of the housing 1' through an inlet pipe 121', is filtered out by the filter 4' and discharged by an outlet pipe 133', which is integrally formed with the housing 1' and has a tapering shape. Filtered impurities scraped off by the scraping element 32' and the grindings and debris generated by and between the scraping element 32' and the filter 4' may fall through a rectangular opening 15' and then to a tank 5' by gravity. Periodically, these impurities, grindings and debris held in the tank may be discharged through an outlet pipe 51' and a valve 52' (automatically operated or manually operated). Also, the tapering shape of the outlet pipe 133' may reduce the fluid resistance. In addition, to allow this embodiment to be used for liquid, a rectangular opening 16' may be provided in the upper part of the interior of the housing 1 so that the lighter impurities/grindings may rise up through the opening 16' to a tank 17' and then to a weir 124'. Such lighter impurities/grindings may be discharged through an outlet pipe 122' and a valve 123' (automatically operated or manually operated).

The two preferred embodiments of the present invention have been described hereinabove and these embodiments should not be regarded as limiting this invention in any way. Various changes and modifications may be made without departing from the spirit and scope of the present invention, as defined in the appended claims.

I claim:

1. A fluid filtering device, comprising:
   a housing, including a top portion, bottom portion, a wall portion downwardly extending from the periphery of the wall portion and an inlet disposed in the top portion to allow the entry of fluid;
   a driving device, disposed at the top portion;
   a filter, disposed near the bottom portion of the housing; and
   a scraping device, including a connecting element driven by the driving device, wherein the connecting element is a hollow cylinder with an open lower end, a scraping element disposed below the connecting element and abutting the upper edge of the filter and a flexible element is disposed with its upper end in the hollow cylinder of the connecting element and the flexible element is further located; between the connecting element and the scraping element and exerting a constant downward force on the scraping element.

2. The fluid filtering device as claimed in claim 1, wherein the driving device is a motor.

3. The fluid filtering device as claimed in claim 1, wherein the filter and the scraping element are made of porcelain and emery, respectively.

4. The fluid filtering device as claimed in claim 1, wherein the the housing has an inner diameter—and; filter has a diameter that is slightly less than the inner diameter of the housing, an inner bottom surface radially extends from the lower rim of the wall portion and at least one outlet provided at the inner bottom surface.

5. The fluid filtering device as claimed in claim 1, wherein the flexible element is a spring.

6. The fluid filtering device as claimed in claim 1, wherein the scraping device has at least one guiding element to guide the scraping element to move in a vertical manner.

7. The fluid filtering device as claimed in claim 1, wherein the bottom part of the scraping element has an inclined design.

8. The fluid filtering device as claimed in claim 1, wherein an inclined weir is provided at the upper part of the interior of the wall portion, and an outlet is provided near the weir so as to allow the discharge of impurities.

9. The fluid filtering device as claimed in claim 1, wherein a tank is provided below the lower side of the housing so as to store the filtered impurities.

10. A fluid filtering device, comprising:
    a housing, including an end portion, a wall portion downwardly extending from the periphery of the wall portion and an inlet disposed in the end portion to allow the entry of fluid;
    a driving device, disposed at the end portion;
    a filter, disposed in the interior of the housing and away from the end portion; and
    a scraping device, including a connecting element driven by the driving device, wherein the connecting element is a hollow cylinder with an open lower end, a scraping element disposed at the side that is away from the end portion and abutting the upper edge of the filter and a flexible element is disposed with its upper end in the hollow cylinder of the connecting element and the flexible element is further located; between the connecting element and the scraping element and exerting a constant downward force on the scraping element.

11. The fluid filtering device as claimed in claim 10, wherein a weir is provided at the upper part of the interior of the wall portion so as to allow the discharge of impurities.

12. The fluid filtering device as claimed in claim 10, wherein a tank is provided below the lower side of the housing so as to store the filtered impurities.

* * * * *